US011437859B2

(12) United States Patent
Abdelraheem et al.

(10) Patent No.: US 11,437,859 B2
(45) Date of Patent: Sep. 6, 2022

(54) WIRELESS POWER TRANSMISSION BASED ON PRE-MATCHED FILTERING

(71) Applicant: Purdue Research Foundation, West Lafayette, IN (US)

(72) Inventors: Ahmed Mahmoud Mahrous Abdelraheem, Cairo (EG); Michael Dimitri Sinanis, West Lafayette, IN (US); Dimitrios Peroulis, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 230 days.

(21) Appl. No.: 16/843,754

(22) Filed: Apr. 8, 2020

(65) Prior Publication Data

US 2020/0320275 A1 Oct. 8, 2020

Related U.S. Application Data

(60) Provisional application No. 62/851,129, filed on May 22, 2019, provisional application No. 62/831,159, filed on Apr. 8, 2019.

(51) Int. Cl.

| | |
|---|---|
| ***H01F 27/42*** | (2006.01) |
| ***H01F 37/00*** | (2006.01) |
| ***H01F 38/00*** | (2006.01) |
| ***H02J 50/20*** | (2016.01) |
| ***H02J 50/80*** | (2016.01) |
| ***H02J 50/70*** | (2016.01) |
| ***H02J 50/40*** | (2016.01) |

(52) U.S. Cl.
CPC .............. *H02J 50/20* (2016.02); *H02J 50/40* (2016.02); *H02J 50/70* (2016.02); *H02J 50/80* (2016.02)

(58) Field of Classification Search
CPC ............. H02J 50/20; H02J 50/40; H02J 50/80
See application file for complete search history.

(56) References Cited

U.S. PATENT DOCUMENTS

| | | |
|---|---|---|
| 5,672,370 A | 9/1997 | Durance et al. |
| 5,972,397 A | 10/1999 | Durance et al. |
| 9,267,734 B2 | 2/2016 | Durance et al. |

(Continued)

OTHER PUBLICATIONS

L. R. Arnaut, "Operation of Electromagnetic Reverberation Chambers With Wave Diffractors At Relatively Low Frequencies," 2001, IEEE Trans. Electromagn. Compat., vol. 43, No. 4, pp. 637-653.

(Continued)

*Primary Examiner* — Rexford N Barnie
*Assistant Examiner* — Rasem Mourad
(74) *Attorney, Agent, or Firm* — Piroozi-IP, LLC

(57) ABSTRACT

A method of focused wireless power transmission is disclosed which includes generating a map for electromagnetic fingerprints at N locations within an environment of interest, including a transmitter and plurality of receivers each located at one of the N locations, transmitting pre-matched signals based on the electromagnetic fingerprints in a predetermined order for a first location of the N location, measuring response at each of the N locations, measuring spatial correlations between all other locations and the first location, and evaluating electromagnetic power focus at each of the N locations by comparing the measured spatial correlations.

7 Claims, 16 Drawing Sheets

104
100
$h_d(t)$
102
106
h(t)
t
t
$108_1$
$109_1$
$108_2$
$109_2$

(56) References Cited

U.S. PATENT DOCUMENTS

| | | | | |
|---|---|---|---|---|
| 2010/0020996 | A1* | 1/2010 | Elmedyb | H04R 25/453 381/318 |
| 2012/0030963 | A1 | 2/2012 | Durance et al. | |
| 2014/0169196 | A1* | 6/2014 | Kay | H04L 43/026 370/252 |
| 2017/0212210 | A1* | 7/2017 | Chen | G01S 5/0226 |
| 2019/0140766 | A1* | 5/2019 | Anlage | H04K 3/62 |
| 2020/0006988 | A1* | 1/2020 | Leabman | H02J 50/80 |

OTHER PUBLICATIONS

J. M. Ladbury, G. H. Koepke, and D. G. Camell, "Evaluation of the NASA Langley Research Center Mode-Stirred Chamber Facility," 1999, Tech. Note (NIST TN)-1508, vol. 1508, no. Tech. Note (NIST TN)-1508.

D. A. Hill, "Plane Wave Integral Representation for Fields in Reverberation Chambers," 1998, IEEE Trans. Electromagn. Compat., vol. 40, No. 3, pp. 209-217.

C. L. Holloway, D. A. Hill, J. Ladbury, G. Koepke, and R. Garzia, "Shielding Effectiveness Measurements of Materials Using Nested Reverberation Chambers," May 2003, IEEE Trans. Electromagn. Compat., vol. 45, No. 2, pp. 350-356.

J. C. West, R. Bakore, and C. F. Bunting, "Statistics of the Current Induced Within a Partially Shielded Enclosure in a Reverberation Chamber," Dec. 2017, IEEE Trans. Electromagn. Compat., vol. 59, No. 6, pp. 2014-2022.

J. C. West, J. N. Dixon, N. Nourshamsi, D. K. Das, and C. F. Bunting, "Best Practices in Measuring the Quality Factor of a Reverberation Chamber," Jun. 2018, IEEE Trans. Electromagn. Compat., vol. 60, No. 3, pp. 564-571.

D. A. Hill, "Electronic Mode Stirring for Reverberation Chambers," 1994, IEEE Trans. Electromagn. Compat., vol. 36, No. 4, pp. 294-299.

C. L. Holloway, D. A. Hill, J. M. Ladbury, and G. Koepke, "Requirements for an Effective Reverberation Chamber: Unloaded or Loaded," Feb. 2006, IEEE Trans. Electromagn. Compat., vol. 48, No. 1, pp. 187-194.

H. Leaderman, "Eigenmodes and Composite Quality Factor of a Reverberating Chamber," 1957.

T. Matsuoka, S. Fujita, and S. Mae, "Effect of Temperature on Dielectric Properties of Ice in the Range 5—39 GHZ," 1996, J. Appl. Phys., vol. 80, No. 10, pp. 5884-5890.

S. M. Patel, T. Doen, and M. J. Pikal, "Determination of End Point of Primary Drying in Freeze-Drying Process Control," Mar. 2010, AAPS PharmSciTech, vol. 11, No. 1, pp. 73-84.

* cited by examiner

WIRELESS POWER TRANSMISSION BASED ON PRE-MATCHED FILTERING

CROSS-REFERENCE TO RELATED APPLICATIONS

The present patent application is related to U.S. Provisional Patent Application Ser. No. 62/831,125 filed Apr. 8, 2019; and is related to and claims the priority benefit of U.S. Provisional Patent Application Ser. No. 62/831,159 filed Apr. 8, 2019, and to U.S. Provisional Patent Application Ser. No. 62/851,129 filed May 22, 2019, the contents of each of which are hereby incorporated by reference in its entirety into the present disclosure.

STATEMENT REGARDING GOVERNMENT FUNDING

This invention was not made with government funding.

TECHNICAL FIELD

The present disclosure generally relates to wireless power transmission, and in particular, to focused wireless power transmission within a chamber.

BACKGROUND

This section introduces aspects that may help facilitate a better understanding of the disclosure. Accordingly, these statements are to be read in this light and are not to be understood as admissions about what is or is not prior art.

Uniform wireless power transmission within a chamber is of high importance in many applications. One such application is liophilization which is generally known as freeze drying. This process is widely used in both the pharmaceutical and food industries. This process involves controllably removing water content from a frozen solution. Liophilization allows drugs or food products to be kept in a stable form for easier and longer storage. When the drug is required to be used, it can be easily rehydrated by adding water. Anti-cancer and anti-allergic drugs, attenuated vaccines, antibiotics, and probiotics are examples of such drugs that utilize lyophilization.

The typical operation of lyophilization includes loading lyophilizate (the drug solution being lyophilized) into vials. These vials are subsequently loaded into a freeze-drying chamber where they undergo the lyophilization.

The process of freeze drying can be divided into three main steps: freezing, primary drying and secondary drying, while constantly keeping the maximum product temperature below a critical temperature to avoid ruining the product. Therefore, continuous monitoring of the lyophilizate's temperature during the process is necessary for a successful and efficient lyophilization.

While monitoring of individual vials is important, techniques in the current state of the art only allow monitoring the chamber ambient temperature. One of the challenges for developing wireless sensors to monitor the vials' temperatures within the chamber is the need for wireless power transfer system to power these sensors in an electromagnetically difficult environment.

As a result, there is an unmet need for a wireless power transmission (WPT) system and method that can transfer power to sensors with a focused distribution at a large number of positions within a chamber.

SUMMARY

A method of focused wireless power transmission is disclosed. The method includes generating a map for electromagnetic fingerprints at N locations within an environment of interest, including a transmitter and plurality of receivers each located at one of the N locations. The method also includes transmitting pre-matched signals based on the electromagnetic fingerprints in a predetermined order for a first location of the N location. The method also includes measuring response at each of the N locations. The method also includes measuring spatial correlations between all other locations and the first location. The method further includes evaluating electromagnetic power focus at each of the N locations by comparing the measured spatial correlations.

BRIEF DESCRIPTION OF DRAWINGS

FIG. 2 is a block diagram showing the overview of the wireless power transmission system of the present disclosure in time domain with.

DETAILED DESCRIPTION

Figure 1A:
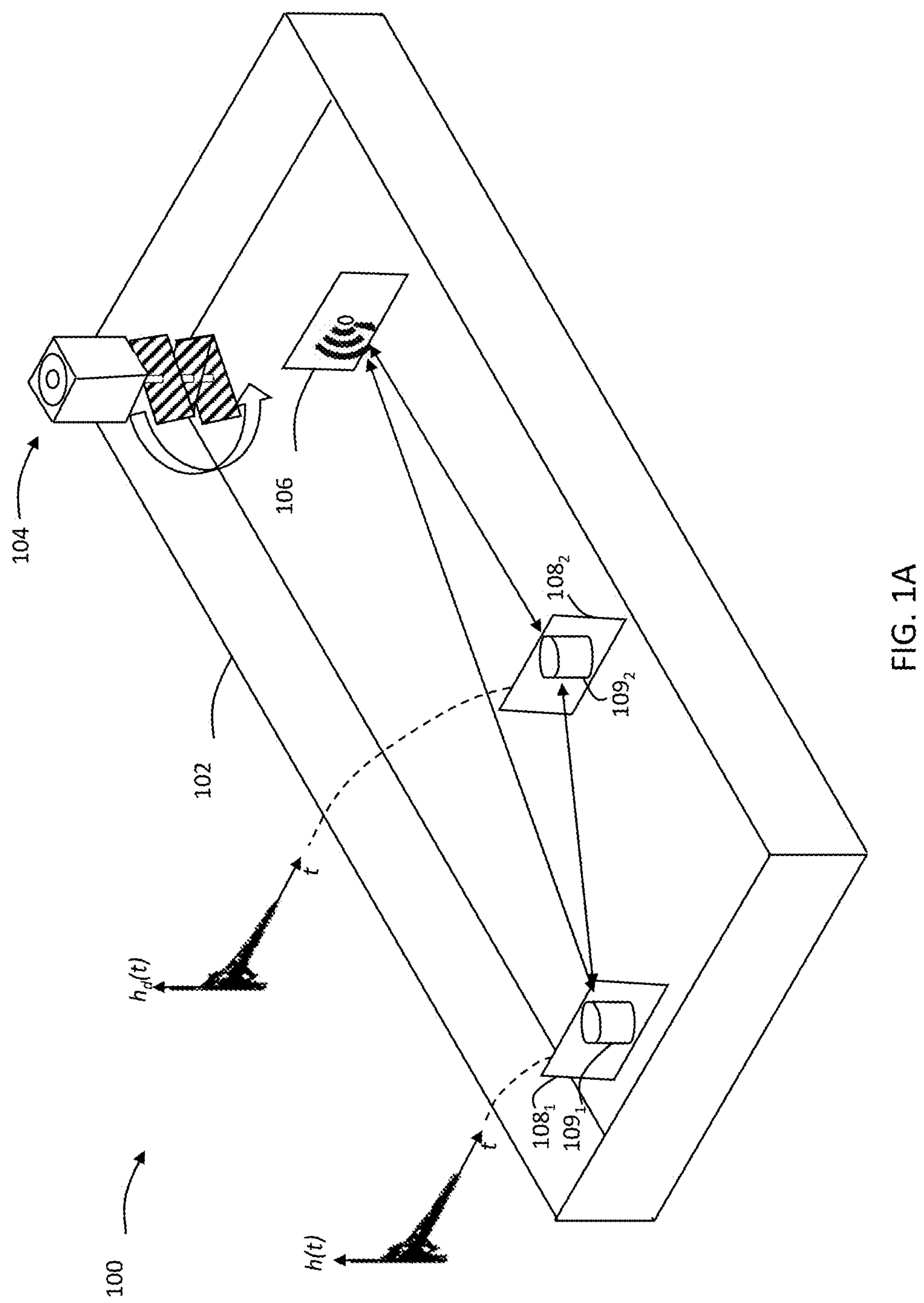
FIG. 1A is a schematic of an embodiment of a wireless power transmission system, according to the present disclosure, having a transmitter and a plurality of receivers, and a stirrer within a chamber.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel wireless power transmission (WPT) system and a method that can transfer power to remote locations within a chamber with a focused distribution at a large number of positions within a chamber are disclosed. The method associated with the system includes utilizing statistical electromagnetism methodology in determining a frequency response from an alternating power source that can generate the desired focused power distribution at these positions.

When a wideband pulse travels from a transmitting antenna in a rich multipath environment (i.e., an environment with a plurality of electromagnetic waves multipath propagation), a spread-in-time version of this pulse arrives at the receiving antenna. In time reversal, this spread version (referred hereinto as "Sona") is recorded, reversed in time and injected back into the channel.

Time reversal represents a methodology in which a system reverses events from a transmitter to a receiver, and thereby transmits the same even from the receiver back to the transmitter. To better understand this technique an analogy is made on a short soccer field. Suppose there are two goalies positioned each at their respective goals. A third-party observer is position at mid-field with equal relative positions to each of the two goalies. The third-party observer is recording the actions on the field. Now, suppose the first goalie from her respective goal kicks the ball in the air over an arch-like pattern towards the second goalie at her respective goal at which time the second goalie is able to down the ball in one swift motion. The third-party observer has recorded the movement of the ball. At this time, the second goalie kicks the ball towards the first goalie over another arch-like pattern which happens to take the same exact path as the first goalie's initial kick. This time the first goalie is able to down the ball, again in another swift motion. The third-party observer again records the motion of the ball. The second goalie would be referred to as a time-reversal mirror (TRM). From the perspective of the third-party observer positioned at the mid-field, the second kick looks to be exactly the same as the first kick, except provided in reverse. Thus, the second goalie's kick is a time-reversal of the first goalie's kick. Stated otherwise, from the third-party observer's perspective, the second kick looks to be exactly the same as the first kick if the first goalie could have wielded the ball from the second goalie to herself, i.e., a reverse kick from the first goalie's position. Now, suppose, the first goalie is replaced with a first plurality of goalies positioned at the first goal, and the second goalie is replaced with a second plurality of goalies at different positions near the second goal. If every one of the first plurality of goalies kicks the ball to a corresponding goalie of the second plurality of goalies in the manner described above with respect to the situation with only the first and second goalies with each kick recorded, and then every goalie of the second plurality of goalies kicks the ball back to the corresponding goalie of the first plurality of goalies in the same manner described above with respect to the situation with only the first and second goalies also with each kick recorded, then the second set of kicks represent the time-reversal of the first set of kicks. This time-reversal with a plurality of kicks is analogous to the Sona referred to above.

The Sona can be thought of as a fingerprint for a given location in the chamber. The antenna that receives and retransmits the Sona is usually referred to as the time-reversal mirror (TRM). When the Sona is injected back into the chamber, the several multipath components add up coherently at the original source location and incoherently elsewhere. This results in a temporal compression (TC) and a spatial focusing (SF). These focusing characteristics depend solely on the channel characteristics. A unique version of a technique known as electromagnetic time reversal (EMTR) can be used to provide not only temporal focusing of power but also spatial focusing. Both are needed in order to focus a time varying electromagnetic output at a particular location.

Figure 1B:
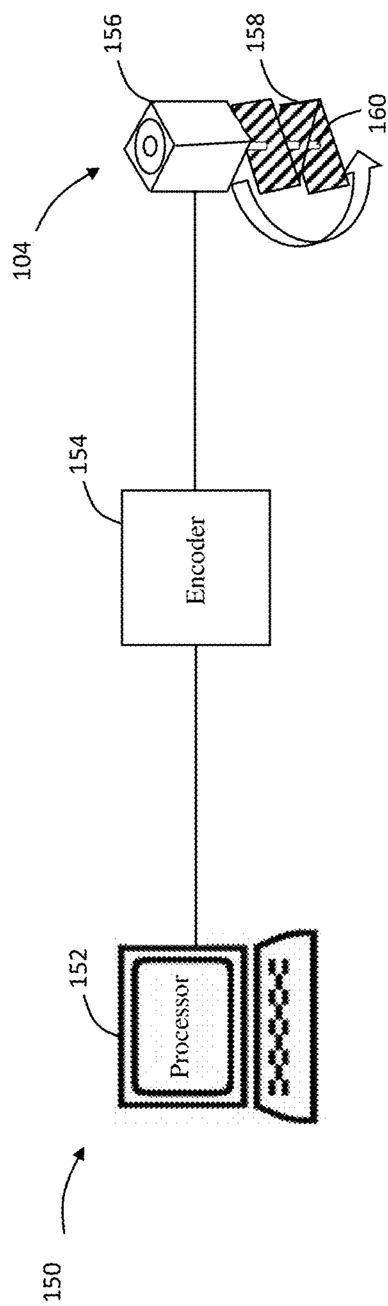
FIG. 1B is a schematic of a mechanical stirring system, according to the present disclosure.

Referring to FIG. 1A, an example of an embodiment of such a novel electromagnetic system 100 according to the present disclosure is shown. In FIG. 1A, the system 100 includes a chamber 102 which according to an embodiment is a metallic Faraday chamber, however, other electromagnetically limiting chambers are within the scope of the present disclosure. Within the chamber 102 there exists a motor assembly 104, and an alternating frequency power transmitter 106. The motor assembly is shown in FIG. 1B, as part of a subsystem 150. The motor assembly 104 includes a motor 156, a stirrer 158 driven by a shaft 160. While the motor assembly 104 is shown inside the chamber 102, the motor 156 can be placed outside of the chamber 102 with the stirrer 158 placed inside the chamber 102. The stirrer 158 is shown as being positioned in one corner of the chamber 102, however, other positions are also within the scope of the present disclosure. As shown in FIG. 1B, the motor assembly 104 is coupled to an encoder 154, which coupled to a processor 152. Only one stirrer 158 is used in this embodiment, however, multiple stirrers and/or motors are within the scope of the present disclosure. Continuous rotating of the stirrer, according to one embodiment, continuously changes the electric and magnetic fields structures to thereby vary statistical electromagnetic environment inside the chamber, in order to simulate a rich multipath electromagnetic environment.

The transmitter 106 is placed in a predetermined location. Two positions $\mathbf{108}_1$ and $\mathbf{108}_2$ are also shown each with a receiver $\mathbf{109}_1$ and $\mathbf{109}_2$. For a given x(t) (i.e., output at the transmitter), e.g., an impulse (δ(tt)), y(t) (i.e., the output at location $\mathbf{108}_i$) is expressed as: $y(t)=x(t)\otimes h(t)$, where ⊗ is the convolution operator and h(t) is the impulse response of the chamber at location $\mathbf{108}_i$. If the output is time reversed (i.e., $y(-t)=x(-t)\otimes h(-t)$) and is then broadcasted by the transmitter (similar to the first goalie discussed above reversing the ball from the second goalie's position), the new signal at location $\mathbf{108}_i$ will be $x(-t)\otimes R_{hh}(-t)$, where, $R_{hh}(t)$ is the autocorrelation function of the impulse response. In a system where there are no multipaths, the new signal at location $\mathbf{108}_i$ (i.e., $x(-t)\otimes R_{hh}(-t)$) would be x(t). This equation states that what is claimed to be a reconstruction of the original input pulse (δ(t) in this case) is nothing more than the autocorrelation of the impulse response. This means that EMTR solely depends on the environment.

Figure 2:
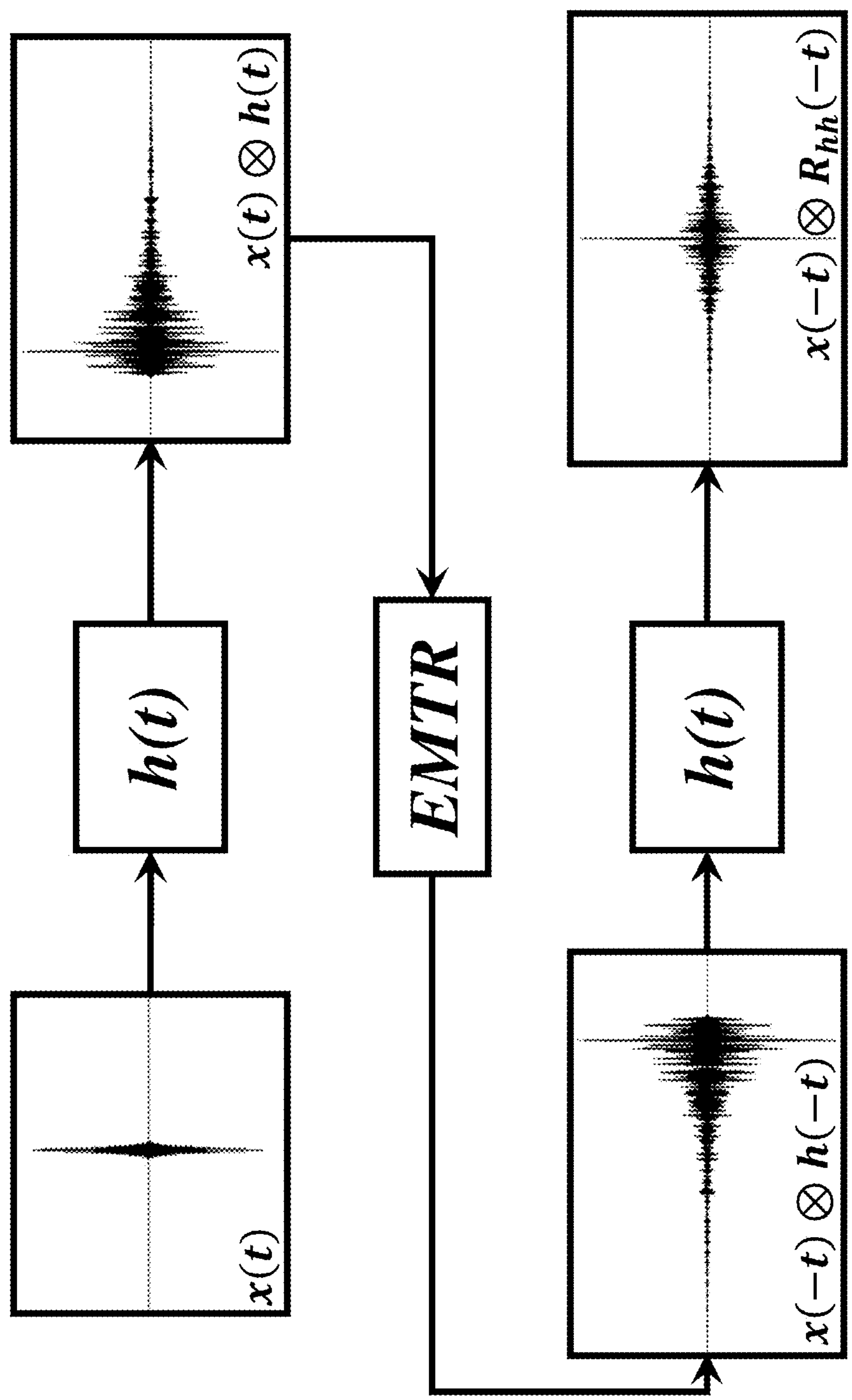

This relationship is shown in FIG. 2, which is a block diagram showing the overview of the wireless power transmission system of the present disclosure in time domain. To determine h(t), an impulse can be used, i.e., by transmitting the impulse ($\delta(t)$). The pulse is received at a location identified as location $\mathbf{108}_1$ (see FIG. 1A). The impulse response at this location is h(t), which is the electromagnetic transfer function of the chamber at this location.

Figure 3A:
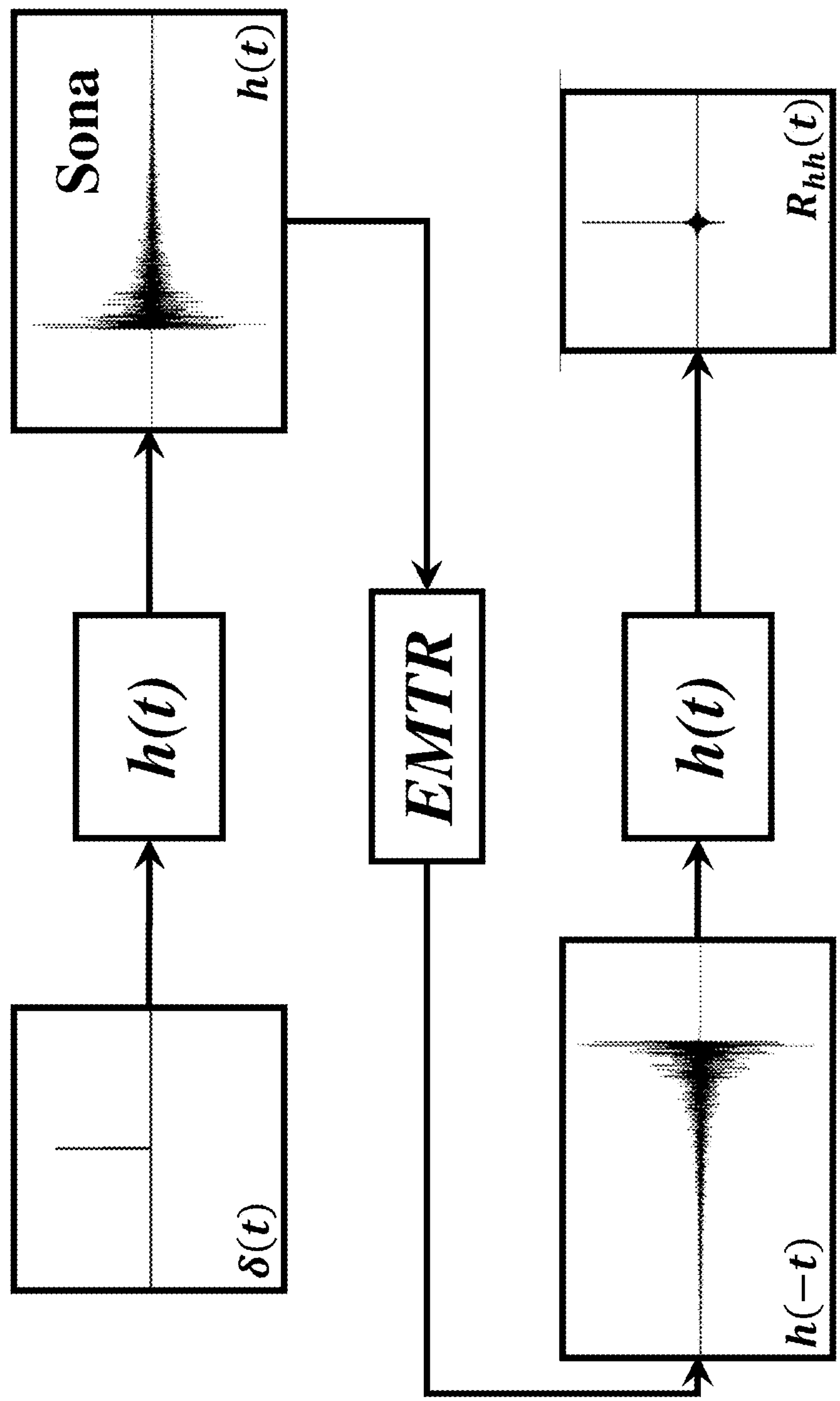
FIG. 3A is a block diagram of FIG. 2 showing the effect of an impulse (i.e., the impulse response of the system shown in FIG. 2).
Figure 3B:
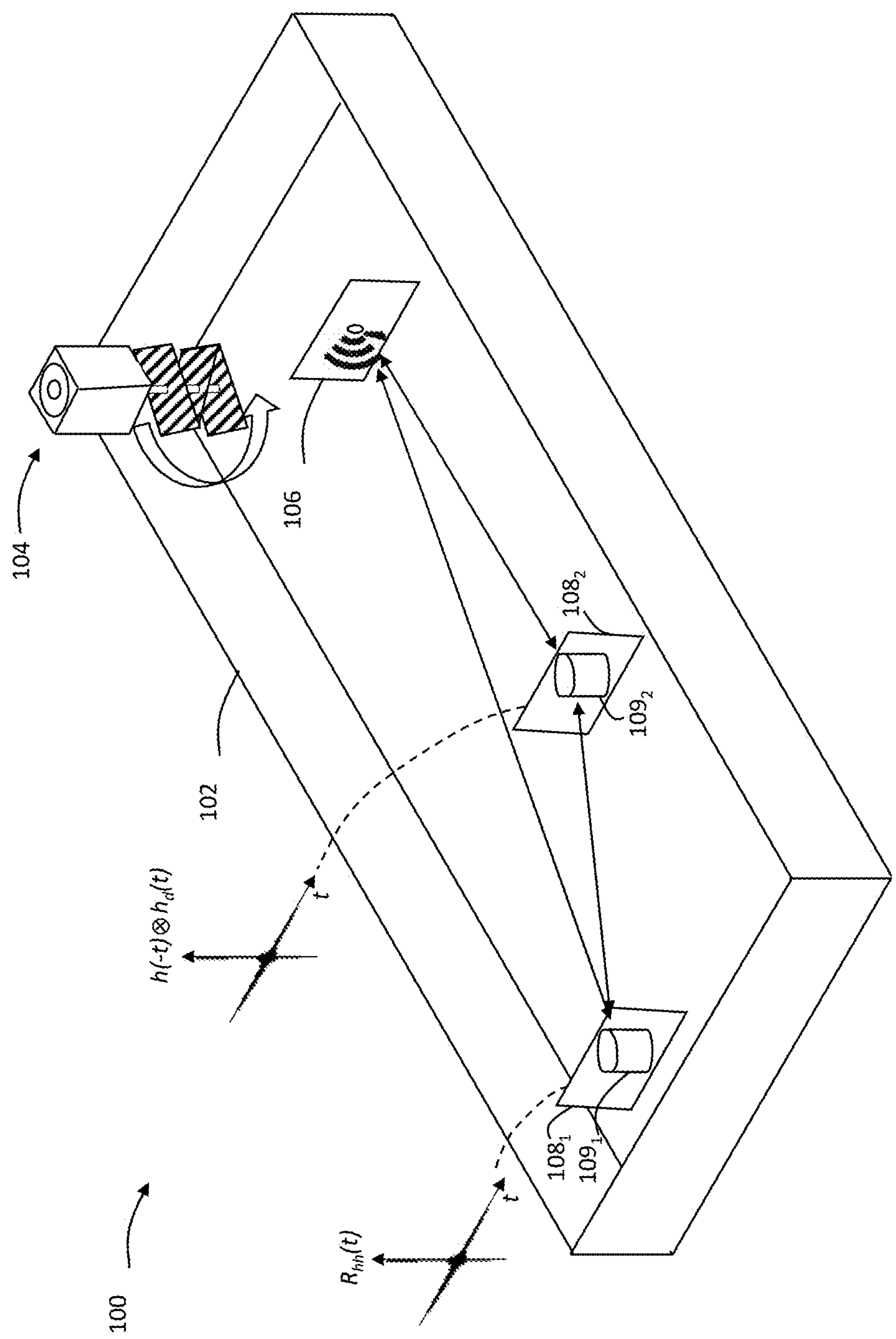
FIG. 3B is a schematic of the wireless power transmission system of FIG. 1A, wherein the system is configured to initially broadcast a function (e.g., an impulse, δ(t)) from the transmitter, and then the response is recorded at the receivers, as the transfer function of the chamber convolved with the broadcasted function (in the case of the impulse, the response is the impulse response).

The impulse response topology is shown in the block diagram of FIG. 3A which is a block diagram of FIG. 2 showing the effect of an impulse (i.e., the impulse response of the system shown in FIG. 2). The time reversed signal at location $\mathbf{108}_1$ (see FIG. 1A) is not exactly the impulse ($\delta(t)$); however, comparing h(t) to $R_{hh}(t)$ (i.e., the response at the location $\mathbf{108}_1$ (see FIG. 1A) to a transmitted time-reversed h(t) (i.e., h(−t)), there is a significant temporal compression (a first step towards focusing power at a particular position within the chamber). In this scenario, the impulse response (h(t)) is called a Sona. Any input pulse can be thought of as a weighted sum of $\delta(t)$ functions. The output pulse before and after employing EMTR becomes a weighted sum of the IRs and the autocorrelation functions, respectively. TC is then a measure of how compressed in time is the $R_{hh}(t)$ compared to h(t). This relationship is schematically shown in FIG. 3B, wherein the same system 100 is configured to initially broadcast a function (e.g., an impulse, $\delta(t)$) from the transmitter 106, and then the response is recorded at the location $\mathbf{108}_1$, as the transfer function of the chamber convolved with the broadcasted function (in the case of the impulse, the response is h(t)). Then the time-reversed version of the response is broadcasted from the transmitter 106 (in the case of the impulse response, h(−t)), which results in $R_{hh}(-t)$ at the location $\mathbf{108}_1$. $R_{hh}(-t)$ is a compressed version of h(t) (see FIG. 1A). The response of this time-reversed broadcast at a second location $\mathbf{108}_2$ defines a spatial correlation function that can be used as described below.

Figure 4:
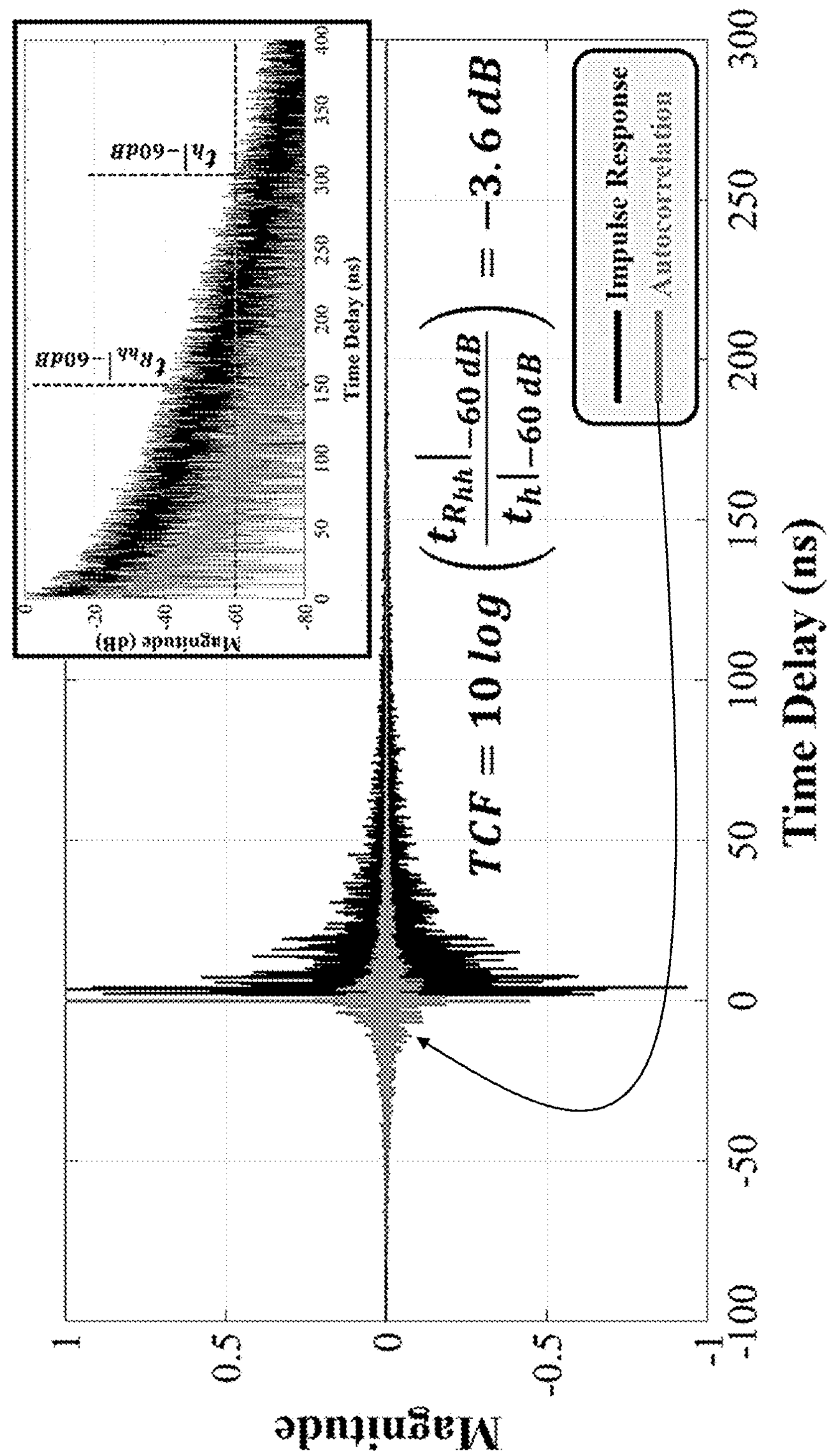
FIG. 4 is a plot of normalized magnitude vs. time delay in ns of the system of FIG. 1A, which provides measured ensemble averages over a plurality of stirrer positions of the impulse responses (h(t)) and the autocorrelations ($R_{hh}(t)$) at a given location.

Referring to FIG. 4, a plot of normalized magnitude vs. time delay in ns is provided. In FIG. 4, measured ensemble averages over a plurality of stirrer positions of the impulse responses (h(t)) and the autocorrelations ($R_{hh}(t)$) at a given location are provided. It is clear that the autocorrelation is more compressed in time than the impulse response. To quantitatively estimate this compression, the root mean square (RMS) delay spread was calculated, with and without applying EMTR. Thereafter, a temporal compression parameter is defined in as:

$$C_{RMS} = \frac{\tau_{IR} - \tau_{TR}}{\tau_{IR}} \times 100$$

where $\tau_{IR}$ and $\tau_{TR}$ are, respectively, the RMS delay spreads of the IR and autocorrelation function. These are measured to be 28.8 ns and 7.5 ns, respectively. These spreads translate to 73.9% temporal compression.

In addition to temporal focusing (i.e., TC), spatial focusing (SF) is also desirous. SF means that all the multipath-components' energy, transmitted by the TRM, confines back to the source location and, ideally, no energy is received elsewhere (this is an oversimplification because it assumes a zero coherence length, but it is useful for understanding SF). Therefore, SF can be evaluated by the spatial correlation function.

Figure 5:
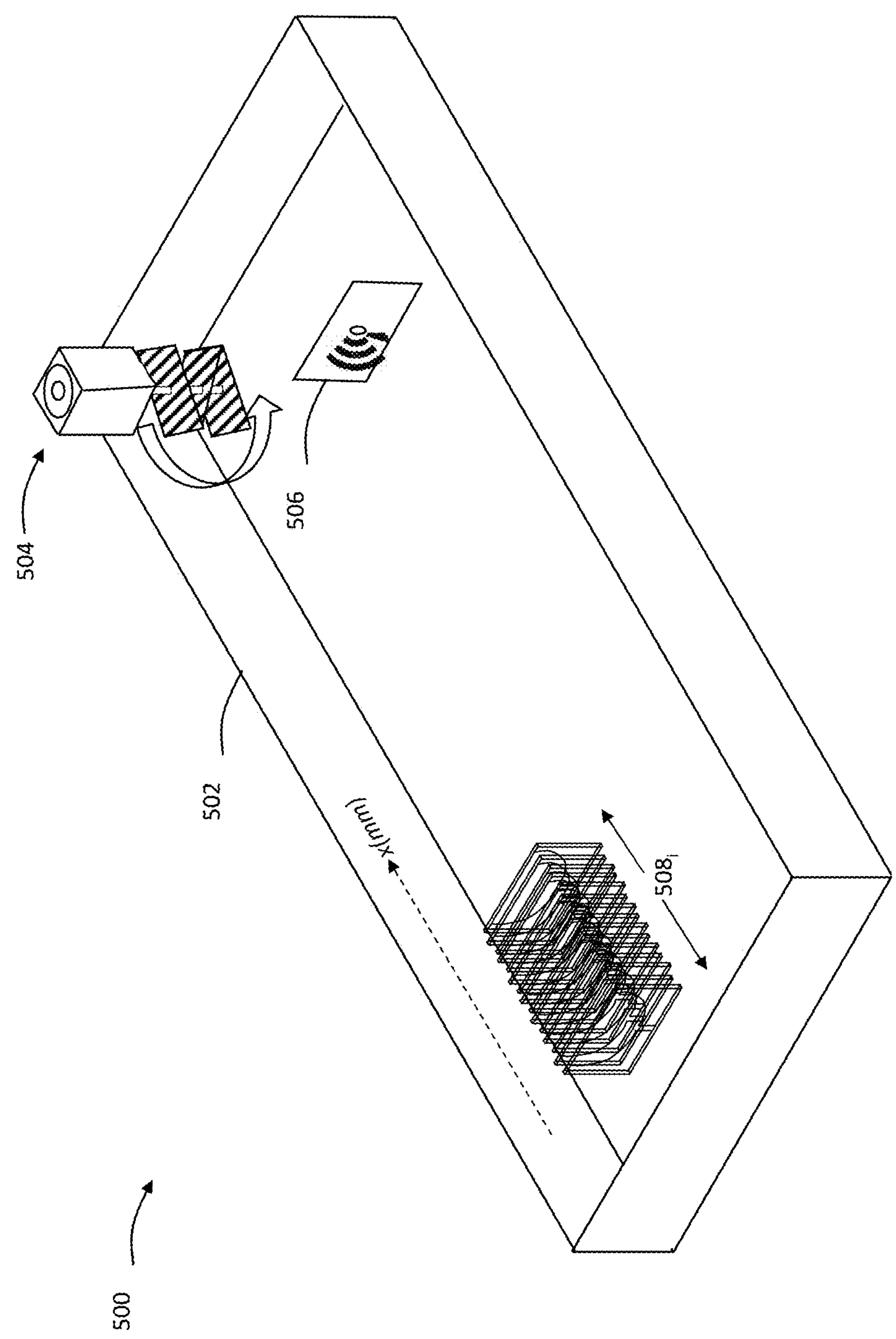
FIG. 5 is a schematic of another embodiment of a wireless power transmission system, according to the present disclosure, having a transmitter and an antenna array, and a stirrer within a chamber.
Figure 6:
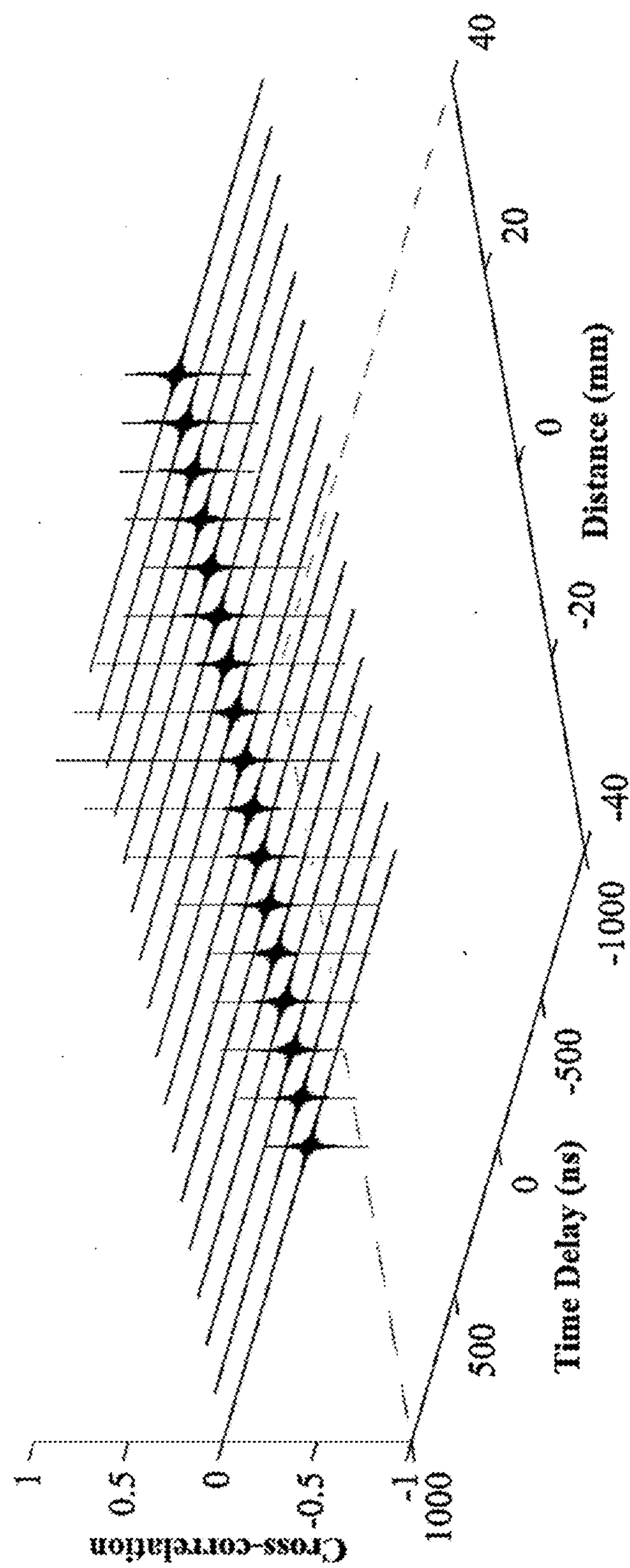
FIG. 6 is a plot of the cross-correlation function shown as a function of time delay as well as antennae position measured in mm for the antenna array of FIG. 5.
Figure 7:
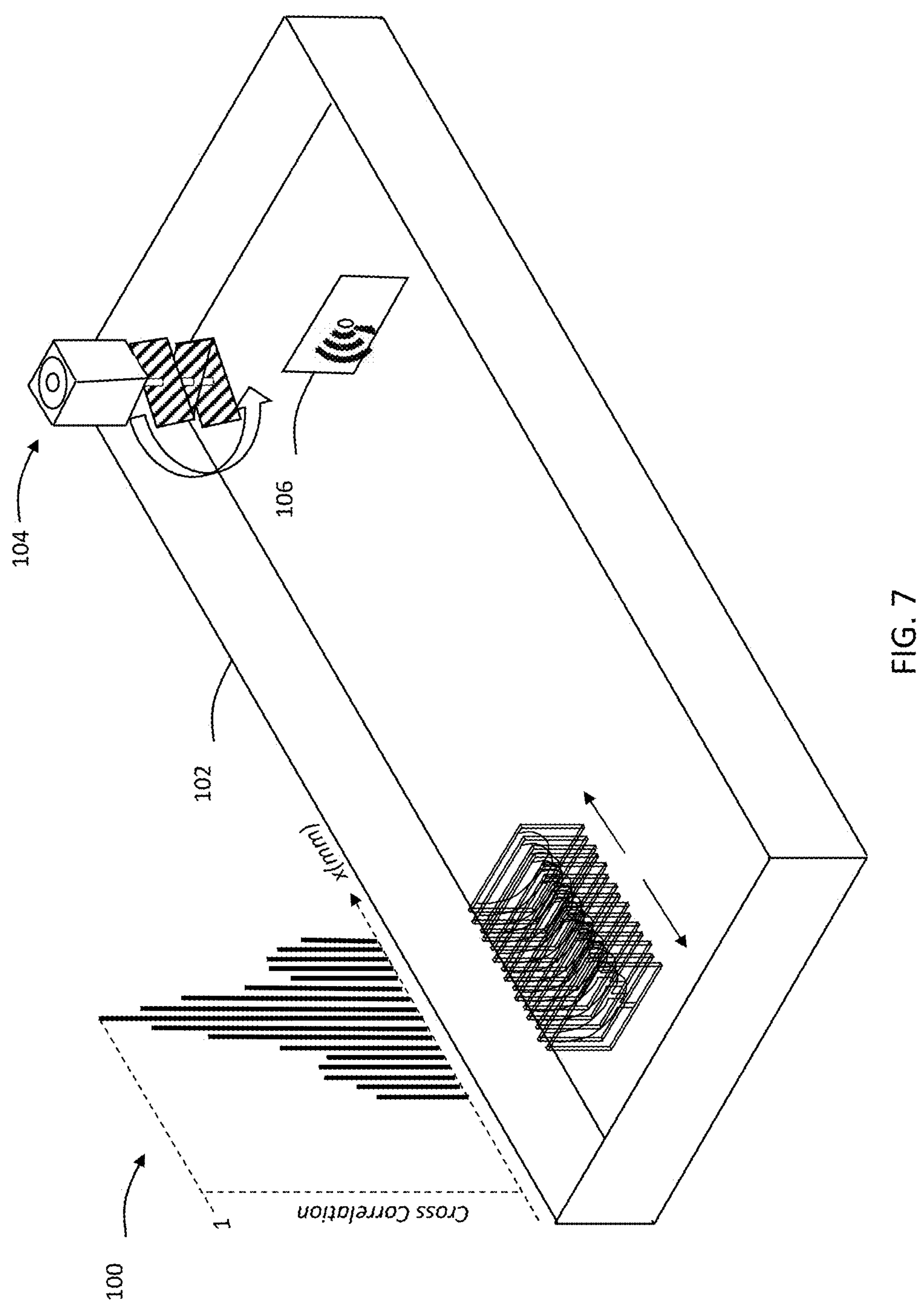
FIG. 7 is the plot of cross-correlation function of FIG. 6 shown with the system and the antenna array of FIG. 5.

The spatial focusing is conceptually shown in FIG. 3B. Spatial focusing can be estimated by a spatial-correlation function which is defined as $h(-t)\otimes h_d(t)$, wherein $h_d(t)$ is the impulse response at the location $\mathbf{108}_2$, as shown in FIG. 3B. The schematic shown in FIG. 3B, is conceptual. To move closer to a practical solution, reference is made to FIG. 5. Shown in FIG. 5 is another example of an embodiment of a novel electromagnetic system 500 according to the present disclosure. In FIG. 5, the system 500 includes a chamber 502 which according to an embodiment is a metallic Faraday chamber, however, other electromagnetically limiting chambers are within the scope of the present disclosure. Within the chamber 502 there exists a motor assembly 504, and an alternating frequency power transmitter 506. An array of antennas 508, are shown separated according to an axis x in (mm) to demonstrate the concept of spatial focusing. The dimensions shown in FIG. 5 and all other figures of the present disclosure are for example purposes only, no limitations are intended thereby. The array antenna 508, has multiple antennas dispersed about a central plane. An example of the pattern of the signal at each antenna 508, of the array is shown in FIG. 6, which is a plot of the cross-correlation function shown as a function of time delay as well as antennae position measured in mm. The highest amplitude is found at the central location (i.e., the location at which the original impulse response was found (i.e., h(t)) and which was used to broadcast the transmitted signal (h(−t)). The lowest signal is found at the spatial limits, which for exemplary purposes here is shown as ±40 mm from the central position. When this signal is received at this central location it will have the form $h(-t)\otimes h(t)$, which but for electromagnetic imperfections of the chamber should be the same as the original $\delta(t)$ but because of those imperfections it would not be. All the antennas about the central plane will have received signals similar in form but attenuated. Referring to FIG. 7, the same configuration as FIG. 6 is shown schematically, but this time with the cross-correlation function. A directivity function, D(d,t) is defined that is inspired by the evaluation of special function in ultrasonic waves to plot the envelope of these cross-correlations.

Plotting the directivity function, D(d,t) provides the maxima of the spatial cross correlations versus distance with the origin being the intended location. In an ideally random environment, the theory of statistical electromagnetics (SEM) predicts the spatial correlation function, $\rho(d)$, of the longitudinal component of the electric/magnetic field at two points d apart from each other to be:

$$D(d,t)=\max[h(-t)\otimes h_d(t)]$$

$$\rho(d)=(1/(kd)^2)[\sin(kd)/(kd)-\cos(kd)]$$

Figure 8:
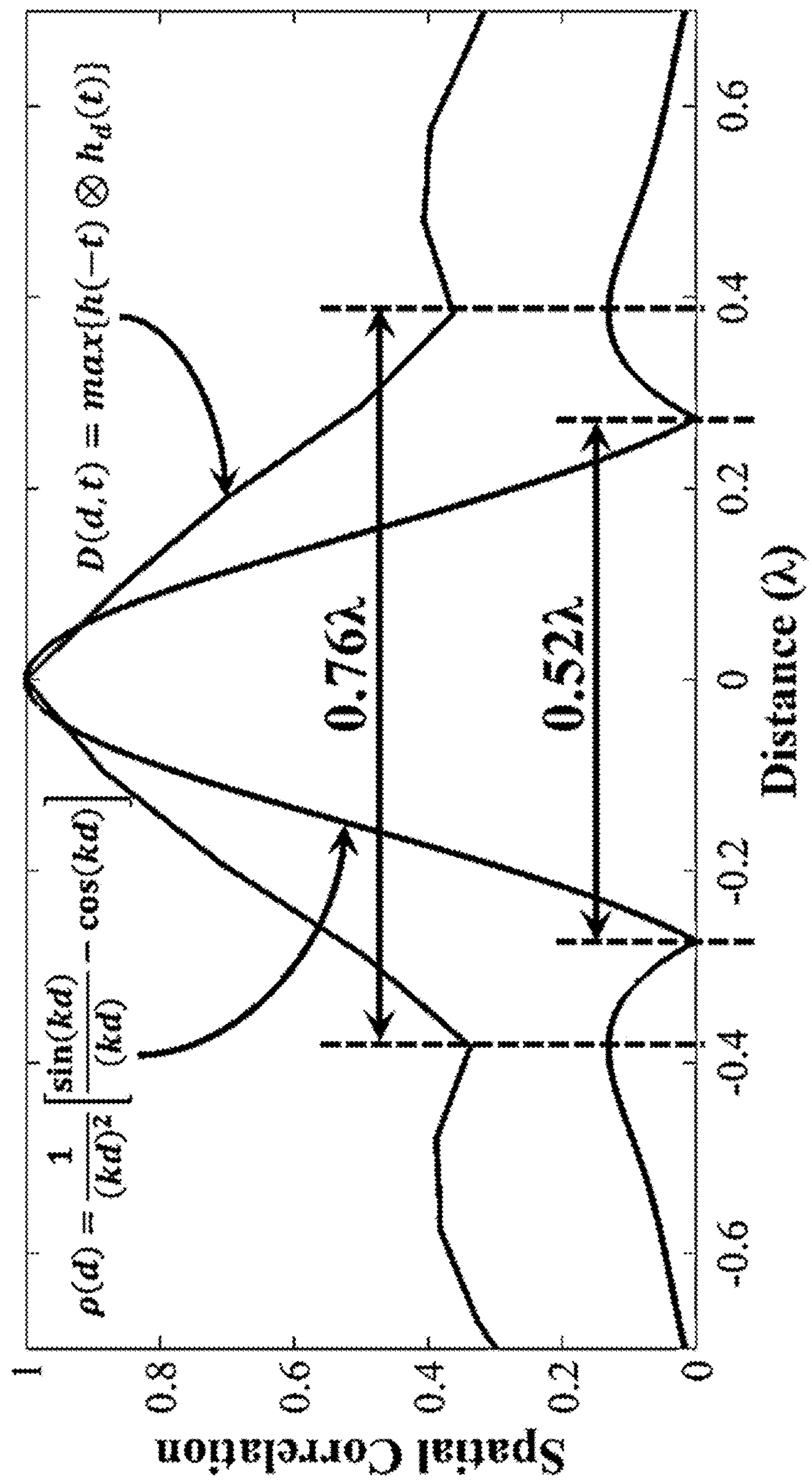
FIG. 8 is a complex plot of a spatial correlation function vs. distance (i.e., the parameter that defines spacing between the antennae in the antenna array of FIG. 5, such that they can be considered at different locations from the electromagnetic time reversal (EMTR) point of view).

The above equation, as known by a person having ordinary skill in the art, determines the coherence length for the chamber which is defined as the minimum distance between two uncorrelated points in space. Within this distance, the maximum focusing is achieved with linearly polarized antennas and it is a main reason for generating a random environment. The following explanation is offered for this observation. Within the coherence length, based on its definition, the Sona change is unnoticeable and spatial focusing is effective. As one moves further, the Sona changes considerably and becomes decorrelated from the IR at this location. The absolute value of the spatial correlation function and the proposed directivity are plotted in FIG. 8, which is a complex plot of the spatial correlation vs. distance (i.e., the parameter that defines spacing between the antennae $\mathbf{508}_i$ such that they can be considered at different locations from EMTR point of view) for the above two equations. The theoretical coherence length is about 0.5λ, whereas the measured one is about 0.78λ. The discrepancy can be attributed to the non-ideal random behavior. To further evaluate the spatial focusing, the energy confined in the main lobe is compared to the total energy delivered to the full travel distance. This is found to be 58%.

Figure 9:
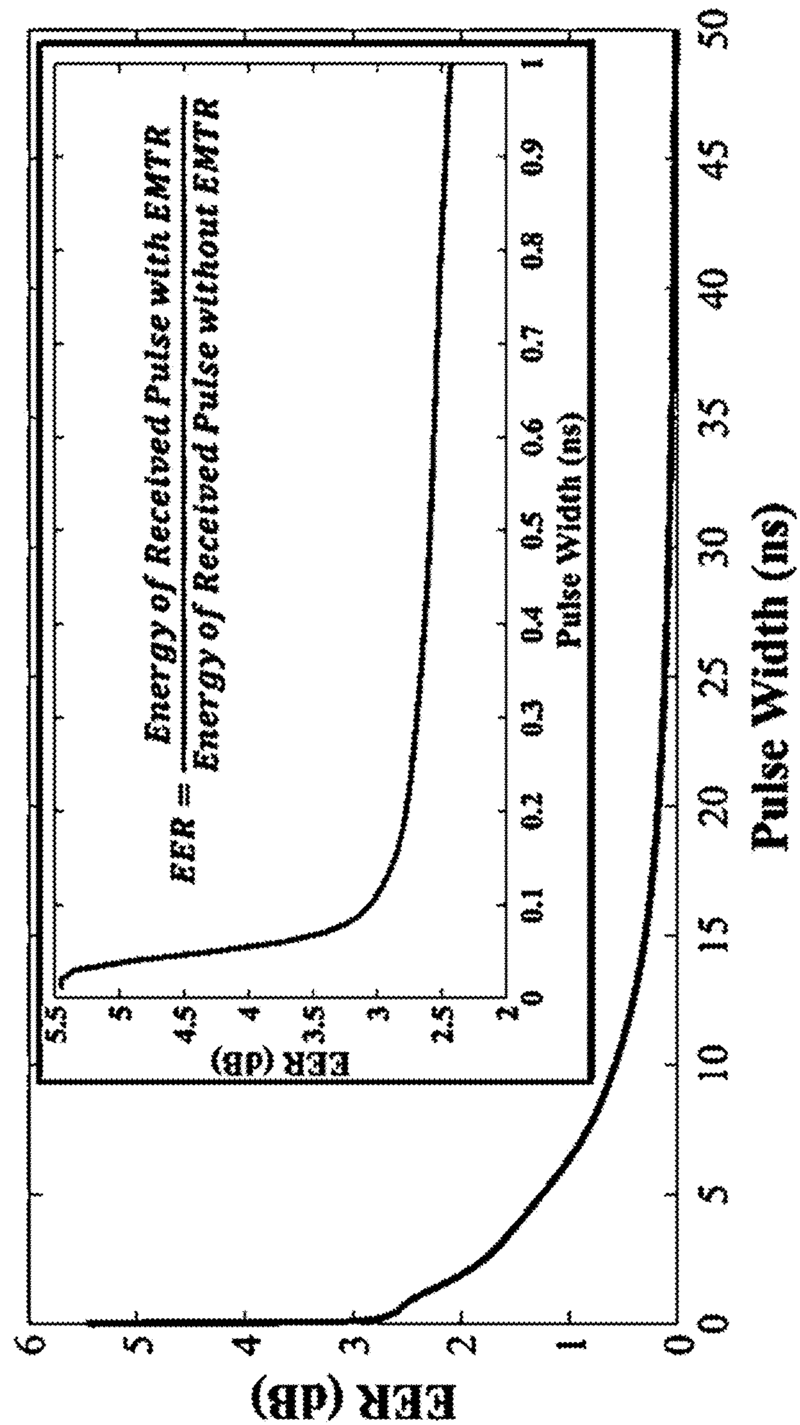
FIG. 9 is a plot of energy enhancement ration (EER) vs. pulse width in ns.

To provide a more physical insight, a parameter defined as the energy enhancement ratio (EER) between the energies delivered to a given point, with and without applying EMTR, is calculated based on the measured IRs. A 6 GHz carrier modulated by a Gaussian pulse with different pulse widths is applied. For fair comparison, all input waveforms are normalized to their energies. A plot of the EER vs. pulse width in ns is shown in FIG. 9. It can be observed that the EER deteriorates as the pulse width increases (bandwidth decreases). In the inset of FIG. 9, a zoomed-in plot of the EER up to 1 ns pulse width is shown. To understand this behavior, the chamber coherence bandwidth ($BW_c$) was measured to be about 9 MHz. $BW_c$ is defined as the minimum frequency separation between two uncorrelated frequency components. At narrower pulse widths, several uncorrelated frequency components are contained. At 10 ps pulse width the energy is enhanced by 5.45 dB. As the pulse width increases, the number of resolvable frequency components decreases. It can be observed that at a 50 ns pulse width (20 MHz pulse BW), the input pulse has only two resolvable frequency components and the EER asymptotically approaches 0 dB, i.e., there is no enhancement and EMTR becomes ineffective. Since the input signal is the time-reversed convolution of the modulated Gaussian pulse with the IR, it can be concluded that the maximum EER is achieved when the input signal is the time-reversed IR.

For the method of the present disclosure, a Sona needs to be selected. A moving paddle is an example of providing a statistical electromagnetic environment, as shown in FIGS. 1A and 5; however other non-mechanical approaches can be pursued, e.g., injecting electronic noise. Without the moving panel the spatial focusing is limited. So far, a single Sona for every single location inside the chamber has been considered. However, with the moving paddle there are multiple Sonas for every single location, and a Sona at each antennae position (e.g., antennae position $\mathbf{508}_i$). This raises a practical question; how to select a Sona for each location that keeps the integrity of the EMTR? This selection directly affects the quality of EMTR. In what follows, the consequences of two simple selections (fixed position Sona & average Sona) are considered and the procedure according to the present disclosure for a third approach that offers a designer-defined performance is also provided.

Fixed Position Sona

According to one embodiment, suppose one selects the Sona at the zero-position (or any other position) of the paddle and ignore the fact that the Sona changes as the paddle rotates. In this case, EMTR will be effective only at the paddle's zero-position. As for the rest of paddle positions, the performance will depend on the cross correlation between the impulse response of the channel at the zero-position and the impulse response at any other positions. This relationship can be referred to as "angular-correlation."

Figure 10:
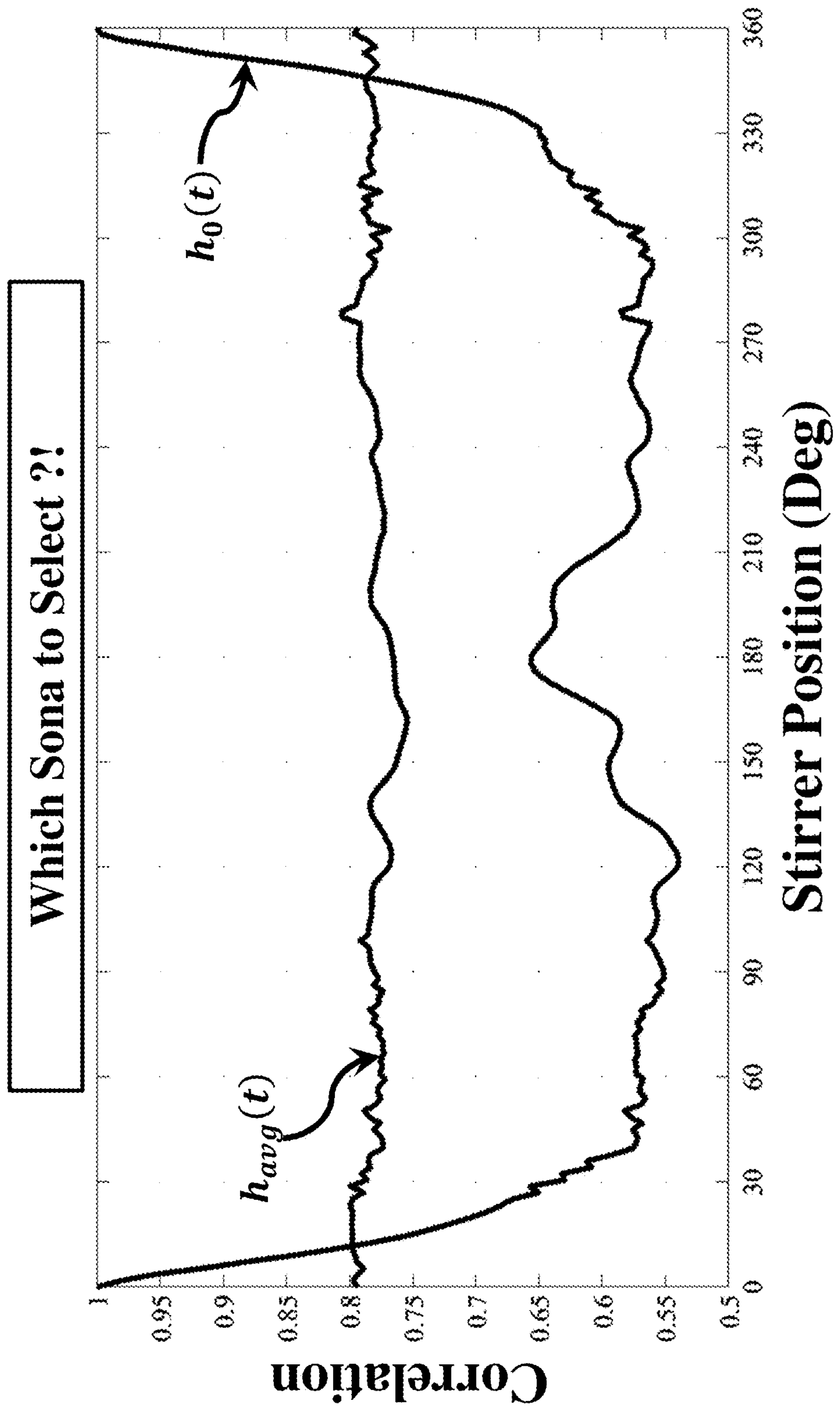
FIG. 10 is a plot of angular correlation vs. stirrer position of FIG. 1A, FIG. 1B, or FIG. 5 measured in degrees for the impulse response of the chamber.

To get the sense of the deterioration in such situation, one can extract the angular-correlation with reference to fixed zero-position Sona at a given location inside the chamber. This is plotted versus paddle rotation angle in FIG. 10 which is a plot of angular correlation vs. stirrer position measured in degrees for the impulse response of the chamber. At zero-position, the angular-correlation is nothing more than the autocorrelation and, hence, the maximum correlation value of 1. As the paddle rotates, the angular-correlation rapidly decreases and the EMTR performance becomes compromised. A minor peak of the angular-correlation is observed at 180° position which can be understood from the symmetry of the paddle shape in the XY plane. The reason this peak doesn't rise up to the maximum correlation of "1" is that the paddle is not symmetric in the z-direction, as shown in FIG. 1A. As the paddle completes a full cycle, the angular-correlation returns to the maximum of "1" at 360°. It is evident now that a fixed position Sona recorded at the zero-position, or any other paddle position, dramatically deteriorates the EMTR performance in a continuously rotating paddle scenario.

Average Sona

According to another embodiment, suppose an ensemble average of all of the impulse responses is used as a single Sona instead of the fixed-position Sona. Once again, the angular-correlation can be extracted, but this time, with reference to the average Sona. It can be observed from FIG. 10 that the deterioration is mitigated. As the paddle rotates, the angular-correlation keeps an average value of $p_{avg}$ which is about 0.8. While this might be a better scenario, it still limits the EMTR performance to this average.

Figure 11:
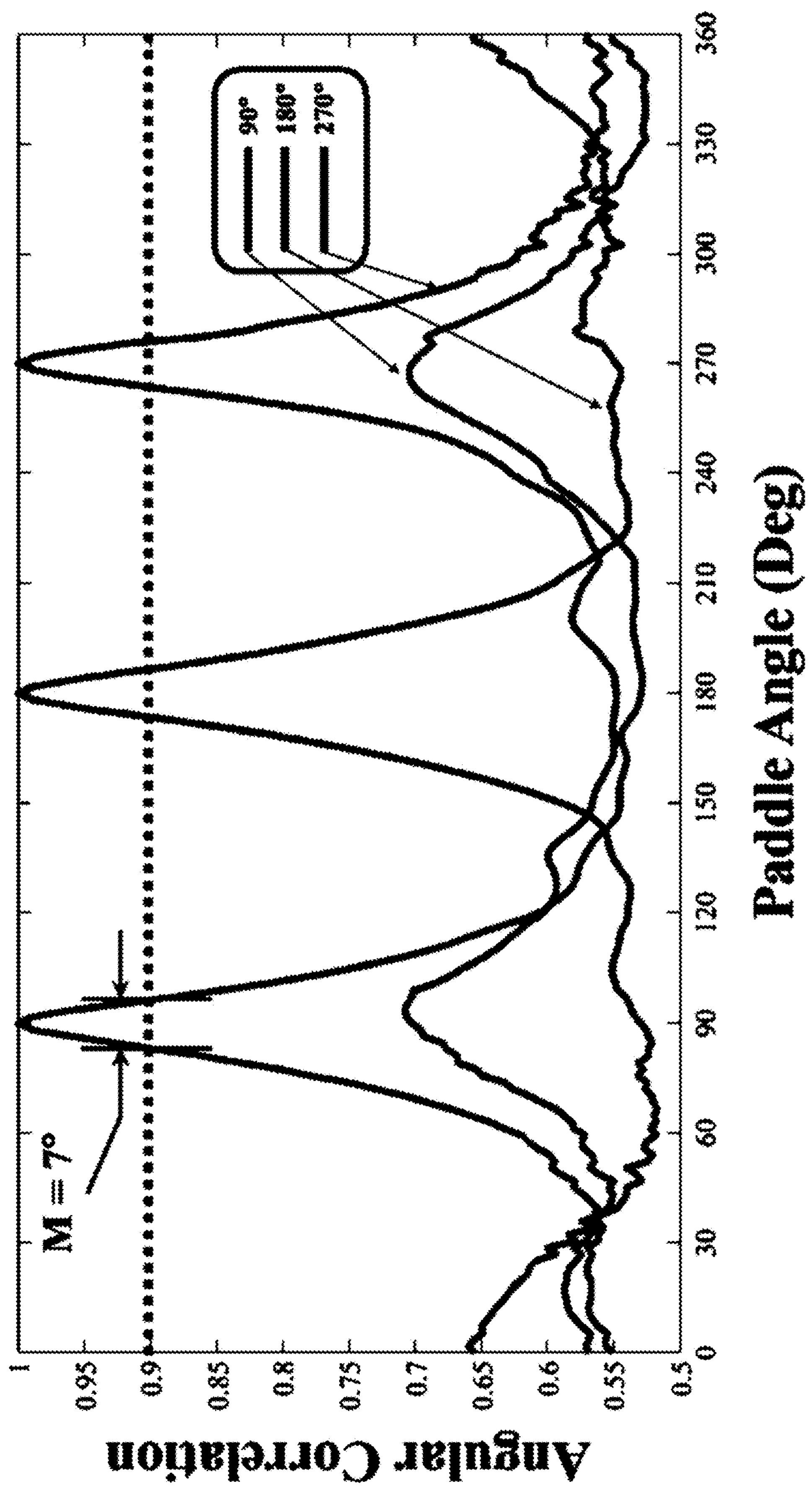
FIG. 11 is another plot of angular correlation vs. stirrer position for paddle position at 90°, 180°, and 270°.

According to yet another embodiment, a procedural method that keeps a selected threshold on the minimum acceptable angular-correlation ($\rho_{thr}$) based on the paddle angular velocity (K) is also discussed. Both $p_{thr}$ and K are designer-defined. The procedure according to the present disclosure is as follows: (i) find out the Sona period, $T_{Sona}$ [s] from any of the measured impulse responses; (ii) select an angular velocity for the Step-Motor (K), or as the case may be for other frequency stirring mechanisms, e.g., rate of change of frequency—let this be 7 [°/s]; (iii) Select an acceptable value for $p_{thr}$ (obviously, this threshold has to be better than $\rho_{avg}$, otherwise it would be simpler to use the average Sona for each location)—let this threshold be "0.9" in the present instance; (iv) calculate the angular width within which this threshold is maintained for any paddle position, M [°/Sona] from the angular-correlation with reference to any paddle position's Sona. This step is further demonstrated as follows. For illustration, the angular-correlations with reference to 90°, 180°, and 270° paddle positions is plotted in FIG. 11. The selected threshold is highlighted in the figure and the angular width is found to be 7°. This angular width will be the same, regardless of the reference Sona, as can be seen from FIG. 10. The idea is to use the same Sona within this angular width. This Sona is to be based on the IR at the center of M. For example, the Sona based on the 90° position covers the paddle positions from 87° to 93°. However, if this Sona is based on any paddle position within M, $\rho_{thr}$ will still be maintained. Next as step (v) calculate the time during which the same Sona will be used, $T_{ss}$ [s].

$$T_{ss}=(M[°/\text{Sona}])/K[°/s])$$

Figure 12:
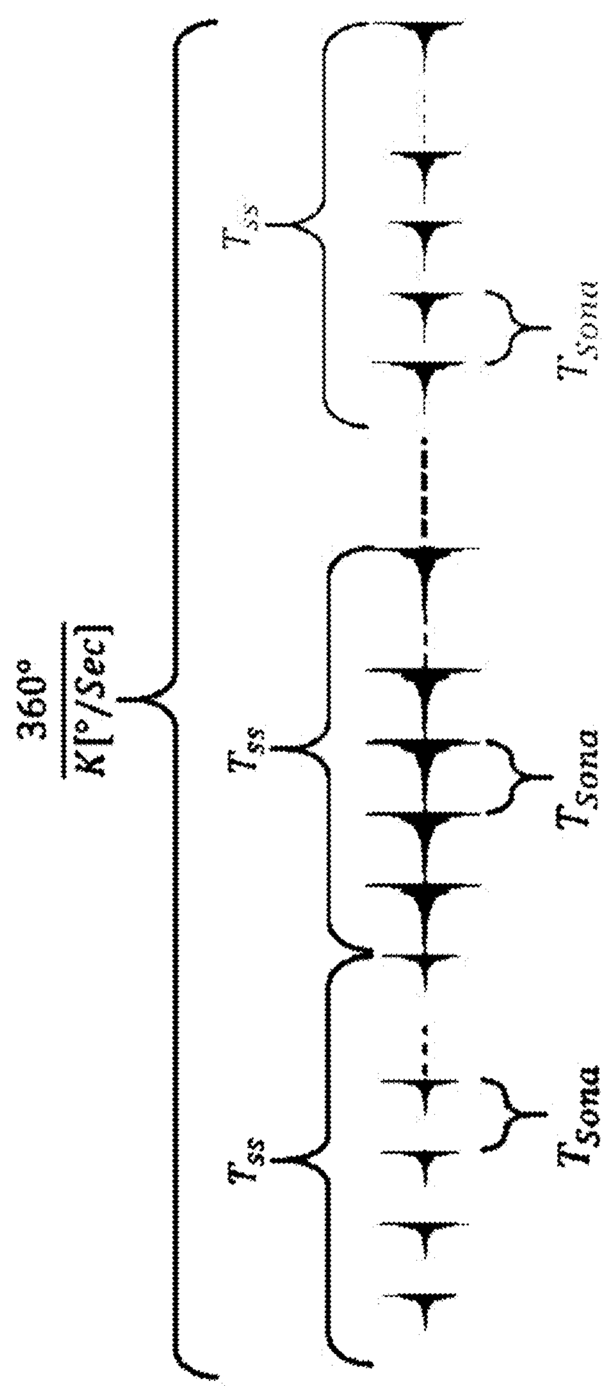
FIG. 12 is a graphical representation of spread-in-time version of pulses which arrive at the receiving antenna with a periodicity.

This is simply which is 1 s for the given selections of K and $p_{thr}$. The next step (vi) is to make sure no partial Sonas are used, check if $T_{ss}$ contains complete periods of Sonas. In other words, $T_{ss}/T_{Sona}$ is an integer. For the given case, since $T_{Sona}$ is 250 ns, then $T_{ss}/T_{Sona}$ is 4×106 [Sonas]. If this is not an integer, a different angular velocity should be selected (step-ii). Finally the last step (vii) is to create a train of Sonas that change the Sona every $T_{ss}$ as shown in FIG. 12. The angular-correlation maintains a value $>p_{thr}$ for all paddle positions. It should be noted that a limit on the paddle angular velocity depends on which of the previous options for the Sona selection is followed. In case of the average Sona, the motor cannot make a full rotation in a time less than $T_{Sona}$. Then On the other hand, if the proposed procedure is followed for Sona selection, then the motor cannot make a full rotation in a time less than $T_{Sona}\times$the number of different Sona trains.

$$K_{max}|_{Avg\text{-}Sona}=360°/T_{Sona}$$

$$K_{max}|_{Thr\text{-}Sona}=360°/T_{ss}(360°/M)=M/T_{ss}$$

Then, the sub-scripts "Avg-Sona" and "Thr-Sona" are used to point out which procedure for Sona selection is used.

Figure 13:
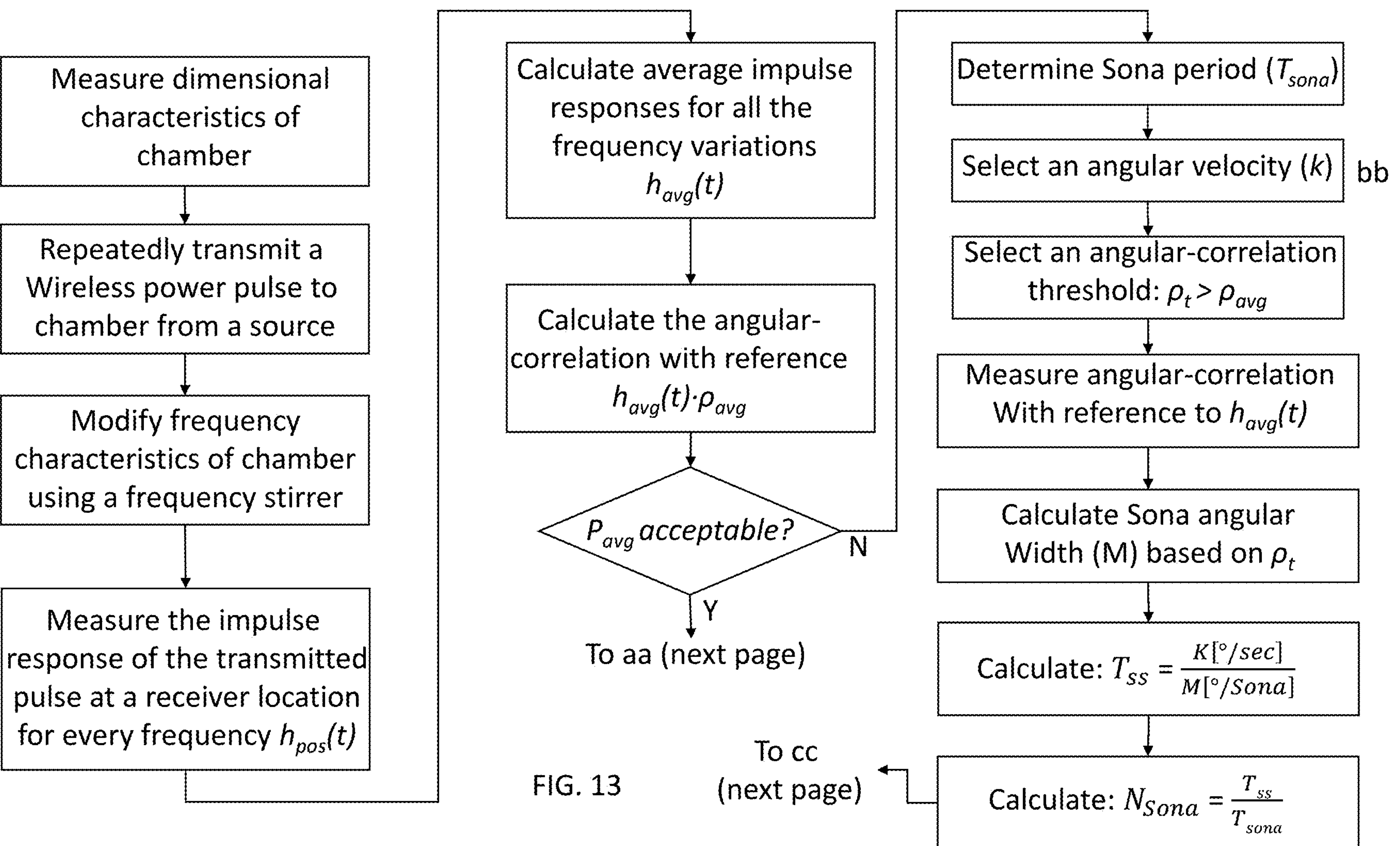
FIG. 13 provided over two pages is a flowchart of the steps of the present disclosure.
Figure 13:
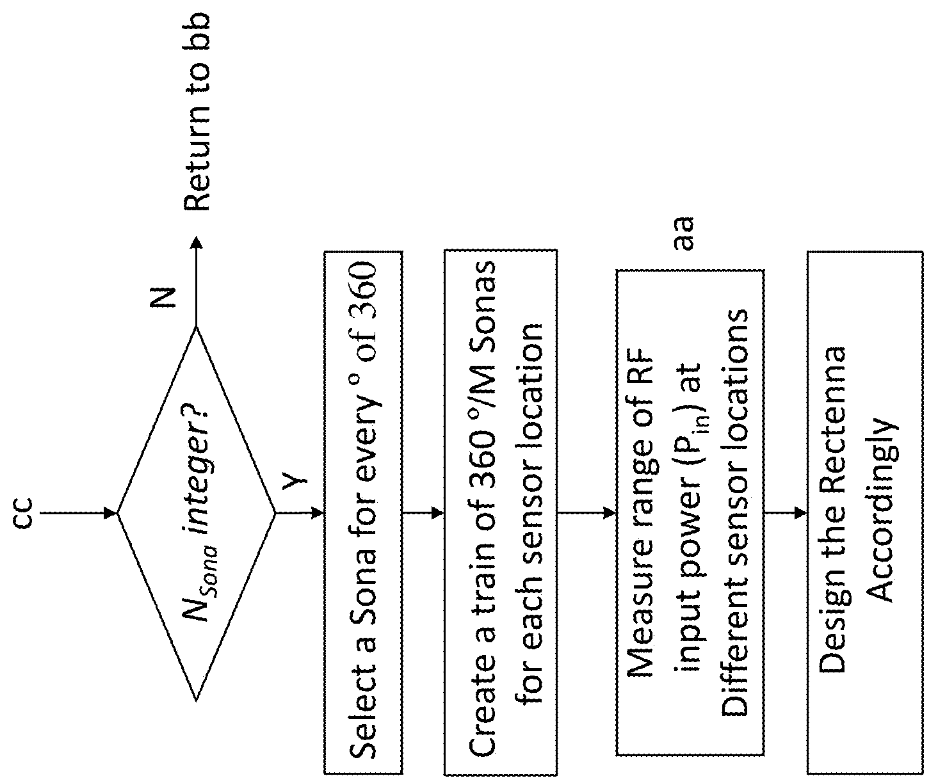

Referring to FIG. 13 (split between two pages) a flow chart is shown depicting the steps of the EMTR according to the present disclosure. Using the approach depicted in FIG. 13, a Sona-map (fingerprint map) is generated to all locations inside the chamber and create a Sona-train for each location based on the designer's acceptable performance threshold. This implicitly defines the angular velocity of the step-motor. The method defines the expected range of RF input power at every location in the chamber.

Those having ordinary skill in the art will recognize that numerous modifications can be made to the specific implementations described above. The implementations should not be limited to the particular limitations described. Other implementations may be possible.

The invention claimed is:

1. A method of providing focused wireless power transmission, from a transmitter to a plurality of receivers in a time-varying electromagnetic environment comprising:

(a) generating a map for electromagnetic fingerprints at N locations within the time-varying electromagnetic environment, including the transmitter configured to provide wireless power to the plurality of receivers each located at one of the N locations and an electromagnetic stirrer configured to modify the electromagnetic environment as a function of time, wherein each fingerprint associated with each receiver location represents a statistical measure of a plurality of impulse responses at different moments for a given receiver location of the plurality of receivers as a function of changes in the electromagnetic environment;

(b) preparing a pre-matched signal for each receiver location based on the statistical measure of the fingerprint at each location, wherein the pre-matched signal is a time-reversed version of the statistical measure of the fingerprint;

(c) measuring response at each of the N locations, wherein the response represents a comparison between time-profiles of a correlation between the associated fingerprint and the associated impulse response at each location and the impulse response at the associated location thereby representing spatial focusing magnitude and area at each location;

(d) preparing a train of pulses for the plurality of receivers, wherein each of the train of pulses represents the associated pre-matched signal at the associated receiver location;

(e) determining an associated time period and number of repetitions of each pulse in the prepared pulse train according to the measured spatial correlations and required power distribution;

(f) providing focused power to the receiver locations;

(g) repeating steps (a) through (f) based on variations in the time-varying electromagnetic environment, thereby providing focused power to the receivers in real-time.

2. The method of claim 1, wherein the statistical measure is based on averaging at different instances.

3. The method of claim 1, wherein the statistical measure is based on moving-averaging at different instances.

4. The method of claim 1, wherein the statistical measure is based on convoluted averaging at different instances.

5. The method of claim 1, wherein the predetermined order and repetitions of the statistical measure of the fingerprints in the pulse train is determined based on the required power distribution requirement inside the time-varying electromagnetic environment.

6. The method claim 5, wherein the environment of interest is a naturally or artificially scatter-rich time-variant environment.

7. The method of claim 1, wherein the pre-matched signals are time-reversed version of the statistical measure of the fingerprints.

* * * * *